UNITED STATES PATENT OFFICE.

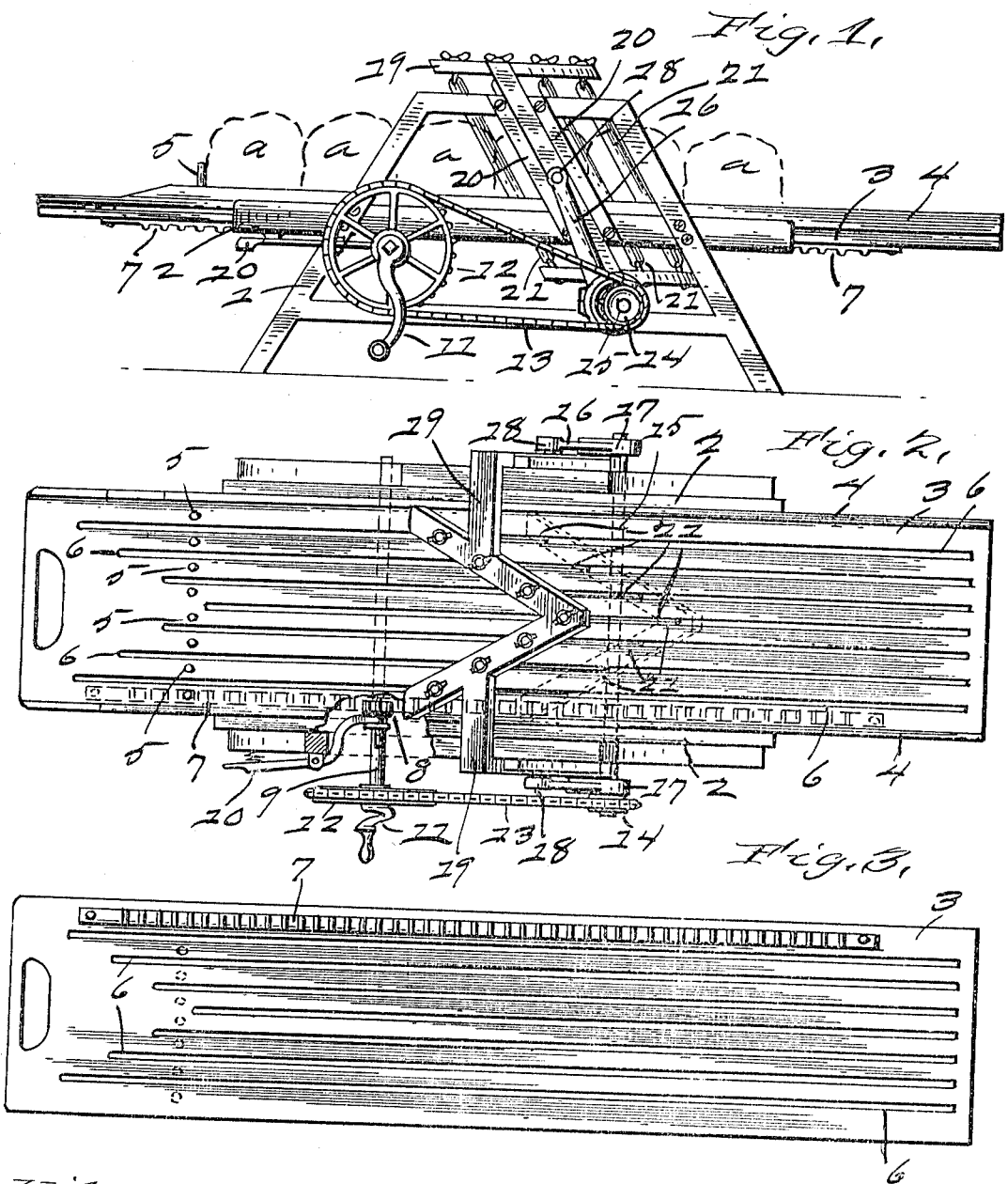

WILLIAM E. HANSON AND THOMAS L. GREEN, OF TOLEDO, OHIO.

BREAD-CUTTER.

1,072,003.

Specification of Letters Patent. Patented Sept. 2, 1913.

Application filed March 8, 1913. Serial No. 753,084.

*To all whom it may concern:*

Be it known that we, WILLIAM E. HANSON and THOMAS L. GREEN, citizens of the United States, residing at Toledo, in the county of Lucas and State of Ohio, have invented certain new and useful Improvements in Bread-Cutters; and we do hereby declare the following to be a full, clear, and exact description of the invention, such as will enable others skilled in the art to which it appertains to make and use the same.

This invention relates to bread cutters for use in hotels, restaurants, and other places where large quantities of bread are consumed, the object of the invention being to cut a number of loaves of bread into slices at a single operation, thereby effecting economy not only in the time consumed but also in the labor involved.

With this object in view and such others as may appear, the invention embodies the novel combination, arrangement and the details of construction hereinafter shown, described and specifically claimed.

In the accompanying drawings illustrative of the invention, Figure 1 is a side elevation of the complete cutter; Fig. 2 is a plan view partly cut away at the side to disclose the means for shifting the sliding gear into and out of engagement with the rack upon the carrier; Fig. 3 is a bottom view of the sliding carrier.

Referring to the details, 1 is a frame having guides 2, 2, between which is mounted a sliding carrier 3 adapted to support the loaves of bread *a, a, a*. Carrier 3 has upstanding sides 4 to hold the bread in place thereon, and 5 are upstanding pins adapted to engage the end loaf upon the carrier and to hold the loaves from moving off the carrier as the latter is advanced. Carrier 3 has a plurality of longitudinal, parallel slots 6, 6, 6 to permit the free movement of the reciprocating knives hereinafter described.

7 is a rack on the lower face of the carrier close to the margin thereof, adapted to be engaged by a pinion 8 feathered to the driving shaft 9, being thrown into and out of engagement with the rack 7 by a manually operated lever 10 connecting therewith. The driving shaft 9 is suitably mounted upon the frame and has a crank handle 11 at one end and a sprocket 12 firmly mounted thereon, a chain 13 transmitting motion to a smaller sprocket 14 mounted upon the shaft 15.

16, 16 are connecting rods having eccentrics 17, 17 at one end and the opposite ends connecting at 18 with a frame 19 mounted to slide between inclined guides 20, the frame carrying a gang of inclined knives 21 arranged in V-form, the knives extending through the slots in the carrier 3, means being provided to secure the ends of the knives to the frame 19 above and below the carrier and to maintain the same under proper tension. By arranging the knives at an inclination and in V-form, as described, it is apparent that each loaf of bread will be sliced from the ends toward the center. This arrangement of knives is important since it is found by experiment that when the knives are arranged side by side to penetrate the loaf at equal depths at the same instant of the operation the entire loaf is lifted from the carrier.

In operation, the loaves of bread are placed upon the carrier as indicated in Fig. 1, the carrier being pulled forward so that all of the loaves will be in front of the knives. As the crank upon the driving shaft is turned, the pinion 8 thereon will engage the rack upon the lower side of the carrier 3 and cause it to advance gradually. At the same time by reason of its driven connection with the driving shaft, the shaft 15 will rotate at an increased rate of speed over the driving shaft, the frame carrying the inclined knives being reciprocated at a rapid rate and causing the loaves to be cut into slices. To return the carrier to its original position, the pinion 8 is shifted along the main driving shaft out of engagement with the rack upon the carrier. When the pinion is thus disengaged the carrier may be pulled back to its original position. Thus the operation is repeated and large quantities of bread may be cut into slices with economy of time and labor.

What we claim, is—

In a bread cutter, a slotted movable carrier, a gang of inclined knives arranged in V-form, having a reciprocating movement through the slots in the carrier, and connected mechanism for reciprocating the knives and simultaneously advancing the carrier.

In testimony whereof, we hereunto affix our signatures, in presence of two witnesses.

WILLIAM E. HANSON.
THOMAS L. GREEN.

Witnesses:
 CARL H. KELLER,
 G. W. KONRATH.